Figure 1:
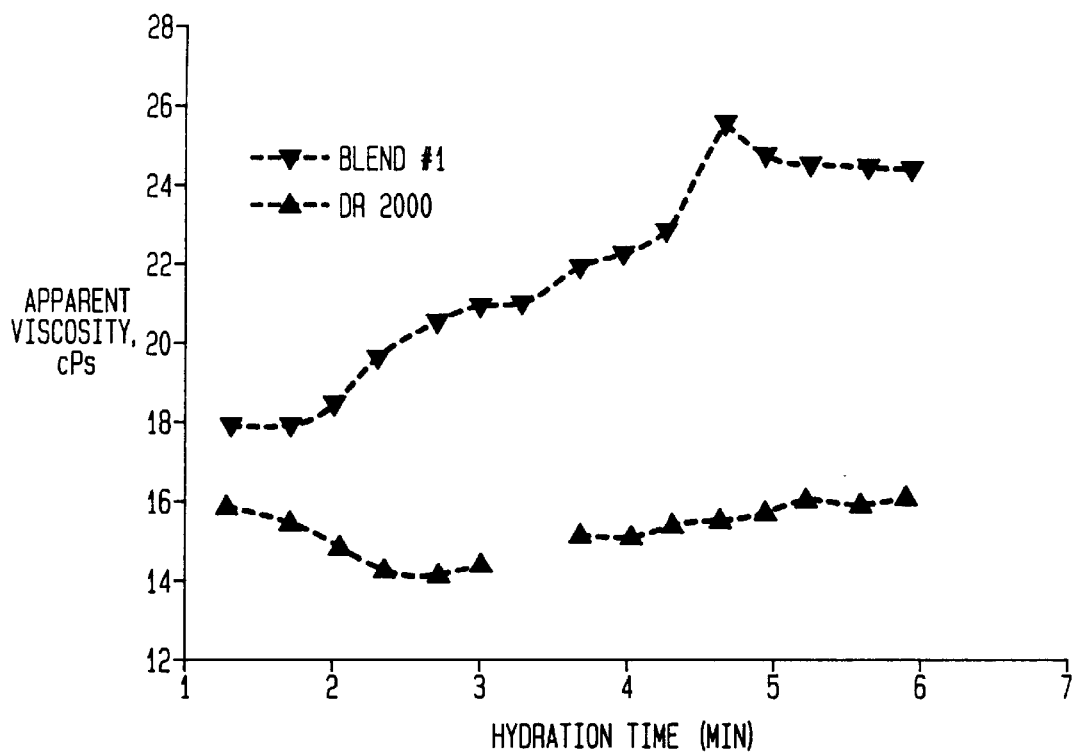
Figure 2:
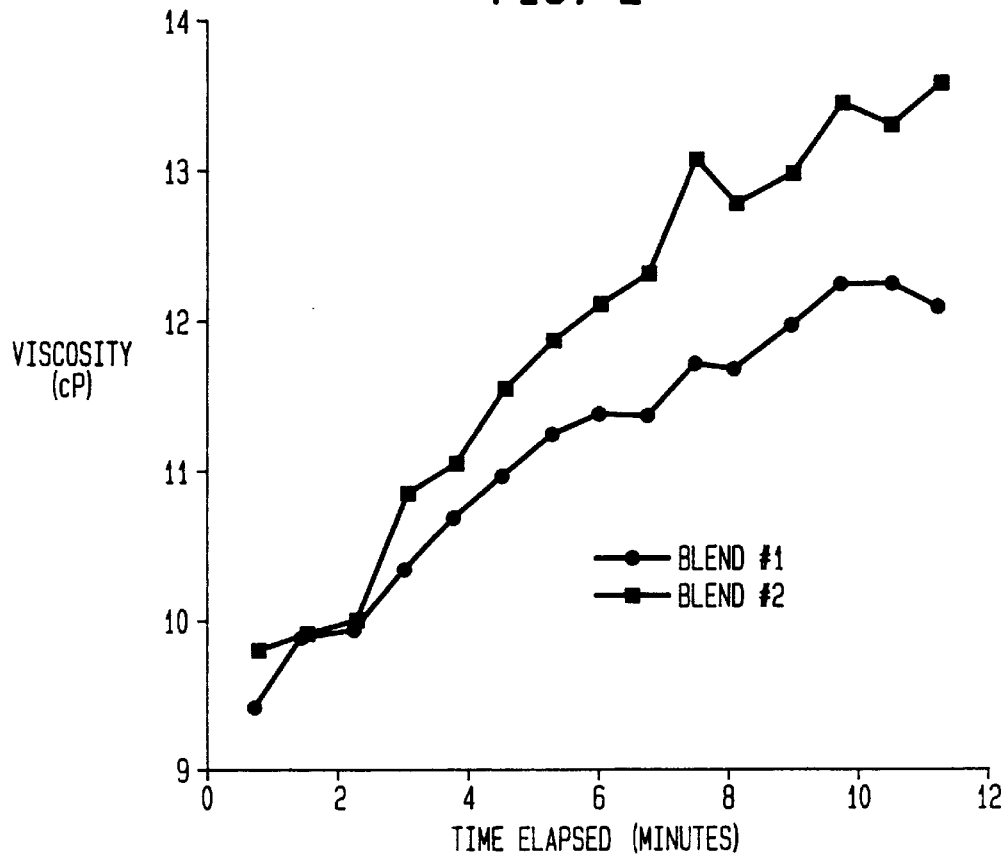

US005964917A

United States Patent [19]
Latting

[11] Patent Number: 5,964,917
[45] Date of Patent: *Oct. 12, 1999

[54] FREE-FLOWING FERTILIZER COMPOSITIONS

[76] Inventor: John Alvis Latting, 12401 Searcy Rd., Kearney, Mo. 64060

[ * ] Notice: This patent is subject to a terminal disclaimer.

[21] Appl. No.: 08/925,921

[22] Filed: Sep. 9, 1997

Related U.S. Application Data

[63] Continuation-in-part of application No. 08/381,581, Jan. 31, 1995, Pat. No. 5,679,128.

[51] Int. Cl.[6] ............................ C05B 17/00; C05C 1/00; A01N 25/00

[52] U.S. Cl. ................................ 71/49; 71/60; 71/64.07; 71/64.03; 71/64.11

[58] Field of Search ............................. 71/49, 60, 64.07, 71/64.11, 64.03, DIG. 11

[56] References Cited

U.S. PATENT DOCUMENTS

| | | | |
|---|---|---|---|
| 4,610,311 | 9/1986 | Bonner et al. | 169/45 |
| 5,078,888 | 1/1992 | Penticoff et al. | 210/639 |
| 5,104,436 | 4/1992 | Lauderdale et al. | 71/27 |
| 5,206,064 | 4/1993 | Scholz | 428/86 |
| 5,550,224 | 8/1996 | Hazen | 536/114 |
| 5,679,128 | 10/1997 | Latting et al. | 71/49 |

*Primary Examiner*—Gary P. Straub
*Assistant Examiner*—Melanie C. Wong
*Attorney, Agent, or Firm*—John A. Shedden

[57] ABSTRACT

The invention relates to free-flowing, powder fertilizer compositions characterized by having enhanced aqueous dissolution rates and being able to produce drift reduced aqueous agricultural spray medium.

Specifically, the compositions are water-soluble, nitrogen-containing fertilizers physically blended with a guar gum drift reduction agent and a silicone defoaming agent either encapsulated or absorbed in an agricultural carrier.

28 Claims, 1 Drawing Sheet

FREE-FLOWING FERTILIZER COMPOSITIONS

This application is a continuation-in-part of U.S. Ser. No. 381,581 filed Jan. 31, 1995 now U.S. Pat. No. 5,679,128.

FIELD OF THE INVENTION

The present invention relates to free-flowing fertilizer compositions which have enhanced aqueous dissolution rates. Specifically, the compositions are water-soluble nitrogen-containing fertilizers physically blended with a guar gum drift reducing agent and a silicone defoaming agent. Most preferably, these unique compositions contain diammonium sulfate crystals blended with hydroxy propyl guar gum and a starch-encapsulated silicone defoaming agent.

BACKGROUND OF THE INVENTION

It is well recognized by the agricultural industry that it is advantageous to the end-users to be able to formulate dry agricultural chemicals such as fertilizers, pesticides, and/or adjuvants so that they can be easily mixed with water and applied by means of a spraying apparatus to a target area.

Mist, or the fine particles end of the droplet-size spectra in these agricultural sprays, i.e., those less than about 150 microns in diameter, often reduce the effectiveness of the chemical delivery process.

When the agricultural sprays are to be directed onto a specific target, the aerial spray or discharge delivery systems are typically mounted on airplanes, tractors, or ground rigs. However, as a result of spray drift, much of the active chemical ingredients in a spray can be rendered ineffective or lost because of the inability of the small diameter spray or mist particles to reach and impact upon the intended target, i.e., the crop or field locus. While small droplets provide better coverage of a target, they are more susceptible to drift than larger droplets. Spray drift represents a loss of agricultural chemical from intended targets and thus results in dangers inherent in air, ground, and water pollution. Since off-target agricultural chemicals are wasted product and can have a negative environmental and economic impact, especially if the agricultural spray medium contains fertilizer and most especially if the medium contains pesticide, it behooves sprayers to reduce this drift induced problem.

In many farming areas, soil is deficient in one or more of the natural nutrients required for satisfactory growth of certain crops. As a result, such crops do not give their optimum yield. When such conditions exist, it is a common procedure to apply a fertilizer rich in the required nutrients (s). The most common fertilizers in use today are the water-soluble, nitrogen-containing fertilizers. Solutions of the fertilizers are usually applied to the crop locus via aqueous spraying techniques; and, as described above, this spraying process usually results in the attendant production of fine mist and droplet drift.

One solution proposed in the art to reduce mist and chemical drift in aqueous agricultural sprays, such as those containing fertilizers, is to incorporate into the aqueous medium a viscosity-increasing amount of a guar gum or derivative of guar gum, specifically non-derivatized guar gum, non-cationic derivatized guar gum, cationic guar gum, or mixtures thereof Although guar gum is often referred to as a cold water swelling polymer, guar gum hydrates in either cold or hot water give high viscosity solutions. The viscosity development depends, to a certain extent, on particle size, pH, and temperature. Guar gum solutions are stable over the pH range of 4.0–10.5. Aqueous solutions of non-derivatized guar gum are often somewhat cloudy because of the small amount of insoluble fiber and cellulosic material present.

All of the commercially important derivatives of guar gum are formed by etherification reactions. The hydroxy alkyl as well as carboxy methyl derivatives tend to be much clearer and more stable than the non-derivatized guar gum. Improved clarity results from the derivatizations and solubilizations of insoluble seed impurities.

However, the aqueous hydration of dry, water-soluble polymers such as guar gum and/or its derivatives in an aqueous agricultural spray medium in order to realize drift reduction properties can often be an arduous and frustrating task for the end-user.

Insufficient dispersion of powdered guar gum caused most often by the too rapid addition of the powder to the aqueous medium or insufficient agitation of the medium during the guar gum addition process of times results in agglomeration or lumps of guar gel. The lumps of guar gel, "fish-eyes", or other inhomogeneity of the mixture can result in difficulty in spraying and loss of drift control. These gel lumps not only cause a lowering of the overall concentrations of dissolved guar gum in the spray medium, and, thus, a reduced drift control of the medium, but also result in medium that will not flow or be readily pumpable and a plugging of the spray nozzle holes. The agglomeration or gellation can be reduced in many cases by adding the guar gum to the aqueous system very slowly with vigorous agitation. Slow addition, however, substantially reduces the efficiency and speed of the end-users processes. For the above reasons, agricultural end-users, such as farmers, continue to desire a fast, effective and simple way of incorporating guar gum and/or its derivatives into their aqueous systems.

By physically pre-blending water-soluble nitrogen-containing fertilizer such as diammonium sulfate with any of the above-described guar gum or guar gum derivatives such as hydroxy propyl guar, formulators can present to the agricultural end-user a dry system that can be easily handled in that, for example, bulky liquid containers do not have to be stored, recycled, etc. and the end-user need not be concerned about ensuring that the weight ratios of fertilizer to drift reduction agent are correct.

Applicants have discovered that, serendipitously, the pre-blended composition of water-soluble nitrogen-containing fertilizer and the guar gum drift reduction agent has the added advantages of enhancing the uniform dispersion and hydration of the guar agent by significantly reducing the agglomeration and gellation problems inherent in the aqueous hydration of powdered guar and its derivatives. Although not wishing to limit the scope of this discovery, the inventive scope to be set forth and determined solely by the claims, it is believed that the water-soluble, nitrogen-containing fertilizers, such as diammonium sulfate which tend to be crystalline, and, thus, are of a higher density than the drift reduction agents, at the outset, initially provide a solid barrier which physically separates the guar gum agent particles, i.e., provides a dilution effect. Secondly, by being of a relatively higher density, the fertilizer crystals tend to quickly pull the guar gum agent particles toward the bottom, i.e., down through the aqueous agricultural medium. The above two effects apparently ensure that a maximum surface area of the guar gum agents remains exposed to the aqueous medium and, thus, the overall hydration rate is enhanced.

Although the pre-blends of water-soluble, nitrogen-containing fertilizer and guar gum drift reduction agent are a decided improvement in the art and provide significant and unexpected advantages to the end-users as described above, problems still occur in actual field use of these blends when end-users, such as farmers, attempt to add the dry blend to a medium which may already contain an agricultural chemical or adjuvant formulation. This is because pesticides and/or adjuvants routinely contain surfactants which generate foam under agitation conditions prevalent in typical spray application equipment. With the presence of foam during the addition of the dry blends, the dispersion of the fertilizer blends is reduced and gelling and agglomeration problems often return.

Accordingly, users of water-soluble, nitrogen-containing fertilizers continue to desire a dry blend containing these fertilizers that can be incorporated into aqueous spray mixtures rapidly and completely to achieve drift reduced, sprayable agricultural media without the formation of agglomerates, gels, or clumps and which can be readily and safely handled in dry form.

SUMMARY OF THE INVENTION

This invention is a free-flowing fertilizer composition comprising water-soluble, nitrogen-containing fertilizer; a guar gum drift reduction agent; and a silicone defoaming agent either encapsulated or absorbed in an agriculturally acceptable carrier; preferably, also containing an oil or nonionic surfactant dedusting agent; and the process for preparing same.

BRIEF DESCRIPTION OF THE DRAWING

FIGS. 1 and 2 are graphical representations of hydration rate comparisons of firstly, a hydroxypropyl guar gum composition versus the guar gum admixed with a fertilizer, and secondly, the latter blend versus the blend with a silicone defoaming agent admixed.

DETAILED DESCRIPTION OF THE INVENTION

In describing the preferred embodiment, certain terminology will be utilized for the sake of clarity. Such terminology is intended to encompass the recited embodiment, as well as all technical equivalents which operate in a similar manner for a similar purpose to achieve a similar result.

The instant invention is a free-flowing fertilizer composition which will rapidly and completely dissolve in water to produce a drift reduced agricultural spray media. A preferred embodiment of this invention incorporates a dedusting agent. Another aspect of this invention is the process for preparing the aforementioned powder composition.

The essence of the invention lies in the discovery that the enhanced hydration rates and the reduction of agglomeration and gellation realized by physical pre-blends of water-soluble, nitrogen-containing fertilizers and the guar gum drift reduction agents can be sustained even when the blend is introduced rapidly into a highly agitated, aqueous agricultural medium if a silicone defoaming agent, either encapsulated or absorbed in an agriculturally acceptable carrier, is incorporated therein.

The water-soluble, nitrogen-containing fertilizer of particular interest in this invention is ammonium sulfate (sometimes called diammonium sulfate) which has the formula $(NH_4)_2\ SO_4$, but other fertilizer compounds such as urea; other ammonium salts, e.g., ammonium chloride, or ammonium phosphates; nitrates, e.g., ammonium nitrate, calcium nitrate, sodium nitrate, or potassium nitrate; or substituted ureas, e.g., urea-aldehyde condensates or methylene ureas may also be employed.

The fertilizer component will often also contain a source of available phosphorous, e.g., in the form of an inorganic phosphate such as ammonium phosphate or a potassium phosphate. A source of available potassium may also be included, e.g., as potassium nitrate, a potassium phosphate, potassium sulfate, or potassium chloride.

The fertilizer component may also include trace elements necessary for satisfactory crop growth, which are sometimes deficient in the soil. Examples are zinc, iron, copper, cobalt, molybdenum, and manganese. Such trace elements may be present as their salts, or as anions such as molybdate or as a complex. For example, iron may be present as a complex with ethylenediamine tetraacetic acid.

The water-soluble, nitrogen-containing fertilizers of the instant free-flowing compositions should be from about 87.50 to about 99.80 weight percent of the composition; most preferably from about 92.0 to about 97.0 weight percent based on the total weight of the composition.

Typical polymers used as drift reduction agents include the polyacrylamides, the polyethylene oxides, the poly (vinyl pyrrolidones), and natural gums such as guar gum and/or its derivatives. Currently, the polyacrylamides are the agricultural industry spray tank additive, drift reduction standard. However, synthetics such as the polyacrylamides, have inherent drawbacks. For example, they are usually distributed in organic carriers which limits the dispersibility and additionally can present a volatile organic component problem for the end user. The polymers themselves are essentially non-biodegradable and, therefore, it would be highly desirable from an environmental viewpoint to reduce their usage. Furthermore, these high molecular weight synthetic polymers are extremely sensitive to shear stresses. The high shear degradation of the synthetic polymers often realizes a significant decrease in solution viscosity over time which results, in spray processing, in a lessening of the droplet-size distribution control effects.

In summary, synthetic polymers, such as the polyacrylamides, have several major characteristics that are not conducive to ease of use or reliable efficiency: difficult dispersibility; low biodegradability; and shear sensitivity.

Natural guar and its derivatives, under controlled conditions; function as excellent drift reducing agents with essentially none of the above-identified disadvantages associated with the synthetic agents such as the polyacrylamide agents.

Guar gum is the refined endosperm of the legume seed of (L.) Taub., a plant which physically resembles the soy plant. The gum is a pure food vegetable colloids recognized by the agricultural, chemical and food formulation industry for many years as having excellent thickening, film-forming and stabilizing properties.

Functionally, non-derivatized guar gum is a cold water swelling, nonionic polysaccharide which develops and maintains its properties over a wide pH range. The guar polysaccharide is a complex carbohydrate polymer composed of essentially a straight chain of mannose units with single-membered galactose branches; chemically classified as a polygalactomannan.

Guar solutions are prepared by sifting dry gum into a vigorously agitated tank of water and permitting the gum to hydrate. Higher water temperatures can shorten the hydration time so long as the heating is not so prolonged or excessive as to degrade the polymer.

The nature of guar allows almost constant viscosity for a given solution concentration over the pH range of 3–10. Above pH 11, a lower viscosity results from the decreased ability of the gum to hydrate. The optimum hydration range occurs between pH 5 and 8. This unusual compatibility of guar over the 3–10 pH range is attributed to the nonionic nature of the molecule. Etherification and esterification reactions are made on the guar hydroxyl functionalities. The $C_6$ hydroxyl position is the most reactive position for etherification, for example, with propylene oxide, but the secondary hydroxyls are also probable sites.

Principle etherification reactions are carboxymethylation via monochloroacetic acid, hydroxyalkylation via ethylene oxide or propylene oxide, and quaternization with various quaternary amine compounds containing reactive epoxide or chloride sites. Anionic and cationic sites modify the way the guar molecule interacts with inorganic salts, hydrated cellulosic and mineral surfaces, and organic particulates.

In general, the hydroxyalkyl ethers of polygalactomannans are prepared by reacting the polygalactomannans with alkylene oxides under basic conditions. In U.S. Pat. Nos. 3,723,408 and 3,723,409, guar flour is reacted with alkylene oxides in the presence of water and sodium hydroxide. The reaction product is then neutralized with acid, washed with an alcohol-water mixture, and is then dried and ground. In U.S. Pat. No. 3,483,121, the polygalactomannans and the alkylene oxides are reacted under basic conditions with small amounts of water and larger amounts of water miscible or water immiscible organic solvents.

Specific hydroxyalkylating agents include ethylene oxide, propylene oxide-1,2; butylene oxide-1,2; hexylene oxide-1, 2; ethylene chlorohydrin; propylene chlorohydrin; and epichlorohydrin.

Hydroxypropylation increases the gum's solubility, resulting in a product which hydrates rapidly, regardless of water temperature. Both hydroxyalkyl and carboxymethyl derivatives typically form clearer solutions than standard non-derivatized guar gum and also hydroxyalkyl derivatives resist thermal degradation better than non-derivatized guar. Hydroxypropyl guar gum is particularly useful as a flow modifier and friction reducing agent and is the most preferred derivatized guar gum of this invention.

Carboxyalkyl ethers and mixed carboxyhydroxyalkyl ethers of polygalactomannans are described in U.S. Pat. Nos. 3,740,388 and 3,723,409, respectively. These derivatives are made by reacting the polygalactomannan with the derivatizing agents (halofatty acid and alkylene oxide) in a water-alcohol mixture followed by washing with water-alcohol mixtures.

Specific carboxyalkylating agents include chloroacetic acid, chloropropronic acid, and acrylic acid.

Carboxymethylation introduces an anionic function to the polymer chain and further increases the solubility of guar gum. Carboxymethyl hydroxypropyl guar gum is exceptional in its ability to suspend undissolved solids.

Other derivatives of polygalactomannans are described in such patents as U.S. Pat. No. 2,461,502 (cyanoethyl ethers), U.S. Pat. No. 4,094,795 (dialkylacrylamide ethers) and U.S. Pat. No. 3,498,912 (quaternary ammonium alkyl ethers). In the described processes, the reactions are conducted in water-organic solvent mixtures and the reaction products are washed with solvents of water solvent mixtures. Specific quaternary ammonium alkylating agents are such agents as 2,3-epoxypropyl trimethylammonium chloride, 3-chloro-2-hydroxypropyl trimethylammonium chloride and the like.

Other agents that can react with the hydroxyl groups of the polygalactomannans to form ether groups are, for example, alkylating agents which include methyl chloride, methyl bromide, ethyl chloride, ethyl iodide and isopropyl chloride; aminoalkylating agents; such as aminoethyl chloride, aminopropyl bromide, and N,N-dimethylaminopropyl chloride; ethylenically unsaturated group containing agents which react through Michael addition with hydroxyl groups such as acrylamide, methacrylamide, acrylonitrile, methacrylonitrile, acrylic acid, sodium acrylate and, in fact, any of the polymerizable monomers which contain one ethylenically unsaturated polymerizable group.

The term "derivatized guar" is meant to include any of the above described derivatized guar gum products.

Non-derivatized guar gum, derived from a nitrogen-fixing, renewable resource, is a versatile, environmentally friendly, highly biodegradable polymer. Derivatized guar gums are slightly less sensitive to biological degradation, as the molecules are less suitable as food for common organisms.

The drift reduction agent of this invention which is selected from the group consisting of non-derivatized guar gum, non-cationic derivatized guar gum, cationic guar gum, and mixtures thereof is from about 0.01 to about 12.49 weight percent; preferably from about 0.01 to about 10.0 weight percent; and most preferably from about 3.0 to about 7.0 weight percent based on the total weight of the powder composition.

A defoaming or antifoaming agent is a material which, when added in low concentration to a frothy or foaming liquid, controls or reduces the foaming problem. The agent equilibrates the rate of foam collapse with the rate of foam formation. The term "defoaming" implies breaking a pre-existing foam whereas "antifoaming" indicates prevention of the formation of that foam. Such distinctions can call for different product performance characteristics.

Whereas a defoamer is expected to exhibit rapid knock-down of a foam, longevity of action might be the key requirement in many antifoam applications. Many, if not most, applications require both preventative and control functions, and, in practice, the same types of materials are used for both antifoaming and defoaming. Thus, the general term defoaming agent is meant to encompass both types and degrees of action.

The physicochemical control of foam is most obviously useful for increasing the holding capacity of vessels, improving filtration, dewatering, washing and drainage of various types of suspensions, mixtures or slurries. The term physicochemical is used, rather than chemical for current theory suggests that although dewetting helps thin the bubble film and promote instability, foam collapse may be due to the direct mechanical shock of the event. Although the use of vegetable and mineral oil defoaming agents have been known for some time, most highly effective defoaming agents today are complex, formulated and proprietary specialty chemicals. In addition to the reduction of foam and its associated features such as rate of foam knockdown and the persistence of the effects, other frequently needed application requirements of these specialty materials include adequate shelf life, absence of adverse effects on the medium or target being treated, ease of handling, lack of toxicity to formulators and end-users, environmental acceptability and cost-effectiveness.

The polysiloxane based defoaming agents have been found to be the compositions of choice for the expectedly outstanding results achieved by the granular fertilizer compositions of the instant invention.

Polysiloxanes, despite their considerable defoaming effectiveness in non-aqueous systems, show little foam-inhibiting activity in aqueous surfactant solutions. However, when substituted and compounded with hydrophobic silica, highly effective aqueous defoamers result.

The three most common ways of preparing the hydrophobic silica are to spray silica with silicone oil and heat at 250–350° C.; to treat silica with organochlorosilane vapors in an autoclave; and to disperse silica in a silicone oil at elevated temperatures. Hydrophilic silica can also be produced by treatment with various alcohols, fatty amines, and hydrocarbon waxes.

The polysiloxanes used to prepare the defoaming agents of this invention can be alkyl, alkoxy, or aryl substituted. Cyclic polysiloxanes and hydroxylated polysiloxanes can also be utilized.

The preferred silicones used to prepare the defoaming agents of the instant compositions are the polydimethylsiloxanes having a molecular weight in the range of from about 200 to about 200,000 and a viscosity in the range of from about 20 to about 2,000,000 centistokes, preferably from about 500 to about 50,000 centistokes at 25° C. The polymers are generally end-blocked with either trimethylsilyl or hydroxyl groups, but other end-blocking groups are also suitable. The polymers can be prepared by various techniques such as the hydrolysis and subsequent condensation of dimethyldihalosilanes, or by the cracking and subsequent condensation of dimethylcyclosiloxanes.

The preferred silicone defoaming agents are prepared by combining the polydimethylsiloxane with particulate silica. Such combinations of polydimethylsiloxane and silica can be prepared by affixing the silicone to the surface of the silica, for example, by means of the catalytic reaction disclosed in U.S. Pat. No. 3,235,509.

Foam regulating agents comprising mixtures of silicone and silica prepared in this manner preferably comprise silicone and silica in a silicone:silica ratio of from 20:1 to 200:1, preferably about 25:1 to about 100:1. The silica can be chemically and/or physically bound to the silicone in an amount which is preferably about 0.5% to 5% by weight, based on the silicone. The particle size of the silica employed in such silica/silicone foam regulating agents is finely divided and should preferably be not more than 100 millimicrons, preferably from 10 millimicrons to 20 millimicrons, and the specific surface area of the silica should exceed about 50 m²/g.

It is most preferable that the milky liquid silicone/silica defoaming agent be in a relatively dry solid form for incorporation into the free-flowing granular fertilizer compositions of this invention. To that end, the most preferred embodiment of the instant invention is one wherein the liquid silicone/silica defoaming compound is either encapsulated by an agriculturally acceptable material or absorbed in an agriculturally acceptable solid carrier. The encapsulating material is preferably a coating that preserves the integrity of the defoaming agent, but allows rapid disruption when in contact with the aqueous media. An example of such an encapsulating material is starch. A starch encapsulated, silicone/silica proprietary antifoam composition is commercially available from Rhone-Poulenc under the trademark RHODORSIL EP-6703. That the starch encapsulated defoaming agents work so extremely well in this invention is particularly surprising in view of the fact that the presence of starch foam presents a considerable defoaming challenge in many industrial processes.

Relatively solid defoamers also can be produced by absorbing the liquid silicone/silica defoaming agents into inorganic solid sorbent carriers such as clay, finely ground haolin, talcum, chalk, limestone, attapulgite, pumice, precipitated silica, pyrogenic and fumed silica, attaclay, dolomite, diatomaceous earth, etc. Water-soluble inorganic sorbent carriers such as sodium sulfate, sodium carbonate, calcium carbonate, or sodium tripolyphosphate can also be used.

The silicone defoaming agent in this invention is from about 0.01 to about 12.49 weight percent; preferably from about 0.01 to about 2.50 weight percent; most preferably from about 0.1 to about 1.0 weight percent based on the total weight of the fertilizer composition.

Handling of dry powder or granule compositions can be hampered by the tendency of these compositions to generate undesirable dust. The dust associated with dry, particulate water-soluble fertilizers and polymers can present the same conventional handling problems as are encountered with similar particulate materials—one major concern is the possibility of dust explosions.

In order to overcome the dusting and its potential problems, dust inhibiting, i.e., dedusting agents are usually added. Dedusting agents can have electrostatic binding characteristics, but more typically are liquid and/or tacky compounds. Also, in the instant invention, it is contemplated that solid or semi-solid dedusting agents can be melted prior to blending with and/or being sprayed upon the dry solid components of the fertilizer compositions.

Suitable dedusting agents include, for example, nonionic surfactants, cyclic hydrocarbons, e.g., decalin and tetralin; phthalic acid dialkyl esters; mineral oils, especially mineral oils with a boiling range of from 130° to 300° C. as well as partially sulfonated mineral oils; silicone oil polymers and copolymers; especially the silicone-containing surface active agents; and mixtures thereof Although simple oils such as mineral or paraffin oils function adequately as dedusting agents, the dedusting agents that also have wetting characteristics such as the nonionic surfactants and nonionic silicone surfactants are much preferred. The most preferred nonionic surfactants are the following:

A) Amides such as:

i) Alkanolamides of the formula—

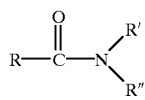

wherein R' and R" each can be —H, —CH$_2$CH$_2$OH, or $$-CH_2-\underset{\underset{CH_3}{|}}{CH}-OH;$$

ii) ethoxylated alkanolamides of the formula—

$$R-\underset{\underset{}{\overset{O}{\|}}}{C}-N\begin{subarray}{l}(CH_2-CH_2-O)_xH \\ (CH_2-CH_2-O)_yH;\end{subarray} \text{ and}$$

iii) ethylene bisamides of the formula—

$$R-\underset{\overset{}{\underset{H}{|}}}{\overset{\overset{O}{\|}}{C}}-N-CH_2-CH_2-N-\underset{\overset{}{\underset{}{|}}}{\overset{\overset{H}{|}}{C}}-R;\atop \overset{}{\underset{O}{\|}}$$

B) Esters such as:
i) fatty acid esters of the formula—

$$R-\overset{O}{\underset{\|}{C}}-O-R_1;$$

ii) glycerol esters of the formula—

$$R-\overset{O}{\underset{\|}{C}}-O-CH_2-\underset{\underset{OH}{|}}{CH}-CH_2-O-R_1;$$

iii) ethoxylated fatty esters of the formula—

$$R-\overset{O}{\underset{\|}{C}}-O(CH_2CH_2O)_{\overline{x}}-R_1;$$

iv) sorbitan esters of the formula—

[sorbitan ester structure with HO, OH groups and —CH—CH$_2$—O—C(=O)—R; and OH]

v) ethoxylated sorbitan esters of the formula—

[ethoxylated sorbitan ester structure: H—(OCH$_2$CH$_2$)$_n$—O, O—(CH$_2$CH$_2$O)$_{\overline{x}}$—H, CH—CH$_2$—O—C(=O)—R, O—(CH$_2$CH$_2$O)$_y$H]

C) Ethoxylates such as:
i) alkylphenol ethoxylates of the formula—

[phenol ring with R, (OCH$_2$CH$_2$)$_n$OH, and R$_1$ substituents]

ii) alcohol ethoxylates of the formula—

$$R-O-(CH_2CH_2O)_nH;$$

iii) tristyrylphenol ethoxylates of the formula—

[tristyrylphenol ethoxylate structure with (OCH$_2$CH$_2$)$_n$OH, three CH(CH$_3$)-phenyl groups]; and iv) mercaptan ethoxylates of the formula—

$$R-S-(CH_2CH_2O)_nH;$$

D) End-capped and EO/PO block copolymers such as—
i) alcohol alkoxylates of the formula—

$$R-(OCH_2CH_2)_{\overline{x}}-(O-\underset{\underset{}{\overset{CH_3}{|}}}{CH}-CH_2)_{\overline{m}}-OH;$$

ii) ethylene oxide/propylene oxide block copolymers of the formula—

$$HO-(CH_2CH_2O)_x-(CH_2-\underset{\underset{}{\overset{CH_3}{|}}}{CH}-O)_{\overline{m}}-(CH_2CH_2O)_{\overline{y}}-H;$$

iii) copolymers of the formula—

$$HO(\underset{\underset{}{\overset{CH_3}{|}}}{CH}-CH_2O)_{\overline{m}}-(CH_2CH_2O)_{\overline{x}}-(CH_2-\underset{\underset{}{\overset{CH_3}{|}}}{CHO})_lH;$$

iv) chlorine capped ethoxylates of the formula—

R—(OCH$_2$CH$_2$)$_x$Cl; and v) tetra-functional block copolymers of the formula—

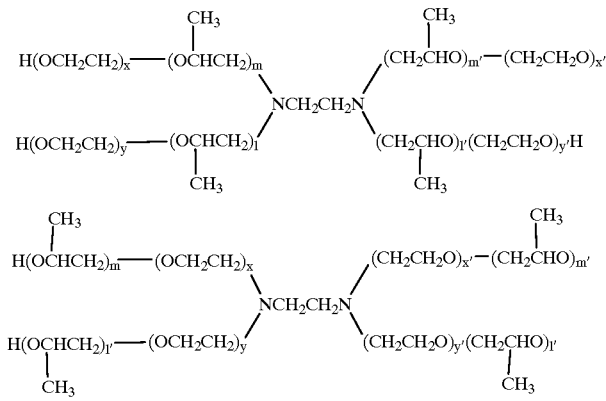

wherein

R is a fatty alkyl group, preferably a $C_6$–$C_{22}$ fatty akyl group, most preferably a $C_8$–$C_{18}$ fatty alkyl group;

$R_1$ is —H or a fatty alkyl group, preferably —H or a $C_6$–$C_{22}$ fatty alkyl group, most preferably —H or a $C_8$–$C_{18}$ fatty alkyl group;

$x, x^1, y, y^1$ and n are each independently moles of ethylene oxide preferably 1 to 300; most preferably 1 to 150; and $m, m^1, 1$ and $1^1$ are each independently moles of propylene oxide, preferably 1 to 300; most preferably 1 to 150.

Also preferred as dedusting agents are the silicone containing surface active agents. This encompasses any and all silicone containing materials which both includes one or more hydrophobic groups and demonstrates surface active properties. Particularly preferred are the use of silicone polymers which include alkoxylate groups such as ethylene oxide, propylene oxide, and mixtures thereof. Examples of silicone surface active agents which may be selected for use in the present composition are disclosed in the following patent documents: U.S. Pat. No. 5,104,647, U.S. Pat. No. 5,017,216, U.S. Pat. No. 5,145,978, U.S. Pat. No. 5,145,977 and WO 94/22311. To the extent necessary for completion, these patents are hereby expressly incorporated by reference.

If incorporated into the fertilizer composition of this invention, the dedusting agent is from about 0.005 to about 15.0 weight percent; preferably from about 0.01 to about 2.5 weight percent; most preferably from about 0.1 to about 1.0 weight percent based on the total weight of the fertilizer composition.

This invention is demonstrated in the following example (s), which are illustrative; not intended to be limiting; and wherein all parts, percentages, etc., are by weight.

EXAMPLE I

Diammonium sulfate crystals and a derivatized guar (AgRHO DR 2000 which is a trademark of Rhone-Poulenc for a proprietary hydroxy propyl guar blend) are blended together and milled to a fine powder. IGEPAL CO-630, a trademark of Rhone-Poulenc for an ethoxylated (8 EO) nonyl phenol nonionic surfactant is sprayed onto the powder blend with continuous mixing. The composition of the final dry, free-flowing powder, identified as Blend 1, is as follows:

or

| Blend 1 | |
|---|---|
| Diammonium Sulfate | 94.10 weight percent |
| DR 2000 | 5.60 weight percent |
| IGEPAL CO 630 | 0.30 weight percent |
| | 100.00 weight percent |

To a first 1500 ml beaker containing 500 grams of tap water is sprinkled a sufficient amount of Blend 1 powder to achieve a 0.1% guar weight/weight mixture of guar and tap water. To a second 1500 ml beaker containing a like amount of tap water is sprinkled a sufficient amount of AgRHO DR 2000 guar composition to also achieve a 0.1% guar weight/weight mixture of guar and tap water.

The rate of hydration of the polymer/water mixture is then monitored by measuring the increase in viscosity of the mixture over time using a Brookfield rheometer interfaced to a Compaq 486 personal computer and equipped with an RV-2 spindle at 55 rpm. Viscosity data is collected every 45 seconds for a total of 6 minutes. During this hydration period, care is taken to maintain the polymer particles in suspension by physically stirring the mixture after the third, sixth, ninth, and twelfth measurements. Each formulation is evaluated four times as described above. The four replicates for each formulation are averaged at each time interval and plotted as a single hydration curve.

The results are as indicated in Table I below and are graphically depicted in FIG. 1.

TABLE I

| | Apparent Viscosity, cps | |
|---|---|---|
| Hydration Time (Minutes:Seconds) | DR 2000 | Blend 1 |
| 0 | | |
| 1:20 | 15.7 | 18.0 |
| 1:40 | 15.3 | 18.1 |
| 2:00 | 14.7 | 18.5 |
| 2:20 | 14.1 | 19.8 |
| 2:40 | 14.0 | 20.6 |

TABLE I-continued

| Hydration Time (Minutes:Seconds) | Apparent Viscosity, cps | |
|---|---|---|
| | DR 2000 | Blend 1 |
| 3:00 | 14.2 | 21.0 |
| 3:20 | — | 21.2 |
| 3:40 | 15.0 | 22.0 |
| 4:00 | 15.0 | 22.2 |
| 4:20 | 15.2 | 23.0 |
| 4:40 | 15.3 | 25.3 |
| 5:00 | 15.5 | 24.4 |
| 5:20 | 15.8 | 24.2 |
| 5:40 | 15.7 | 24.1 |
| 6:00 | 15.8 | 24.0 |

The above tests illustrate that the presence of the water-soluble, nitrogen-containing fertilizer crystals, i.e., the diammonium sulfate results in a significant enhancement of the hydration of the hydroxy propyl guar gum drift reduction agent.

EXAMPLE II

In this example, diammonium sulfate fertilizer crystals and a hydroxy propyl guar gum (AgRHO DR 2000) drift reduction agent are blended together and milled to a fine powder. A starch encapsulated silicone defoaming agent (RHODORSIL EP 6073—a trademark of Rhone-Poulenc) is subsequently blended into the milled powder. Finally, a dedusting agent (IGEPAL CO-630) is sprayed upon the powder blend with continuous mixing. The composition of the final dry, free-flowing, dust reduced fertilizer composition, identified as Blend 2 is as follows:

| Blend 2 | |
|---|---|
| Diammonium Sulfate | 93.8500 weight percent |
| DR 2000 | 5.6000 weight percent |
| IGEPAL CO-630 | 0.3000 weight percent |
| Starch | 0.1875 weight percent |
| Silicone Defoamer | 0.0625 weight percent |
| | 100.0000 weight percent |

To a one quart, wide mouth jar containing 498.5 grams of tap water is added AgRHO FM-3800 (1 gram). The AGRHO FM-3800 (a trademark of Rhone Poulenc) is a complex proprietary composition of surfactants designed to create a very stable foam. The jar is capped and shaken by hand briefly to generate foam. All the water and 600ml of the resulting foam is transferred to a first 1500 ml beaker. A second beaker is prepared as above.

Into the first beaker is sprinkled a sufficient amount of Blend 2 powder to achieve a 0.1% guar weight/weight mixture of guar gum and tap water. To the second beaker is sprinkled a sufficient amount of Blend 1 to also achieve a 0.1% weight/weight mixture of guar gum and water. After a 30 second period, the remaining foam is removed from each beaker to facilitate the measurement of hydration rate.

The rate of hydration is measured as in Example 1.

The results are as indicated in Table II below and are graphically depicted in FIG. 2.

TABLE II

| Hydration Time (Minutes:Seconds) | Apparent Viscosity, cps Blend #1 | Blend #2 |
|---|---|---|
| 0 | | |
| 0:30 | 9.4 | 9.7 |
| 1:30 | 9.8 | 9.9 |
| 2:30 | 9.9 | 10.0 |
| 3:00 | 10.3 | 10.9 |
| 3:30 | 10.6 | 11.1 |
| 4:30 | 10.9 | 11.5 |
| 5:00 | 11.2 | 11.8 |
| 6:00 | 11.3 | 12.2 |
| 6:30 | 11.2 | 12.4 |
| 7:30 | 11.7 | 13.1 |
| 8:00 | 11.6 | 12.8 |
| 9:00 | 11.8 | 13.0 |
| 9:30 | 12.2 | 13.5 |
| 10:30 | 12.2 | 13.4 |
| 11:00 | 12.0 | 13.7 |

The above tests illustrate that when the encapsulated silicone defoaming agent additive of the instant invention is incorporated into water-soluble, nitrogen-containing fertilizer—guar gum drift reduction agent compositions, significant enhancement of the hydration of the drift reduction agent occurs.

The rate of application of the powder blend will be selected in relation to the intended fertilizer effect, taking into account the composition of the powder, the crop, the nature of the soil, the weather, etc.

While the invention has been described with respect to the specific embodiments) it should be understood that they are not intended to be limiting and that many variations and modifications are possible without departing from the scope of this invention.

What is claimed is:

1. A free-flowing powder fertilizer composition comprising:

i) from about 87.50 to about 99.80 weight percent of a water-soluble nitrogen-containing fertilizer;

ii) from about 0.01 to about 12.49 weight percent of a drift reduction agent selected from the group consisting of non-derivatized guar gum, non-cationic derivatized guar gum, cationic guar gum, and mixtures thereof; and iii) from about 0.01 to about 12.49 weight percent of a silicone defoaming agent either encapsulated or absorbed in an agriculturally acceptable carrier; wherein all weight percents are based on the total weight of the powder fertilizer composition.

2. The powder fertilizer composition of claim 1 wherein the fertilizer comprises diammonium sulfate.

3. The powder fertilizer composition of claim 1 wherein the non-cationic derivatized guar gum comprises hydroxy propyl guar gum or carboxy methyl hydroxy propyl guar gum.

4. The powder fertilizer composition of claim 1 wherein the non-cationic derivatized guar gum comprises hydroxy propyl guar gum.

5. The powder fertilizer composition of claim 1 wherein the defoaming agent comprises starch encapsulated dimethyl polysiloxane.

6. The powder fertilizer of claim 1 additionally comprising from about 0.005 to about 15.0 weight percent of a dedusting agent.

7. The powder fertilizer of claim 6 wherein said dedusting agent comprises nonionic surfactant.

8. The powder fertilizer of claim 7 wherein said dedusting agent is a nonyl phenol ethoxylate.

9. A free-flowing, powder fertilizer composition comprising:
   i) from about 87.50 to about 99.80 weight percent of a water-soluble nitrogen-containing fertilizer;
   ii) from about 0.01 to about 10.00 weight percent of a drift reduction agent selected from the group consisting of non-derivatized guar gum, non-cationic derivatized guar gum, cationic guar gum, and mixtures thereof; and
   iii) from about 0.01 to about 2.50 weight percent of a silicone defoaming agent either encapsulated or absorbed in an agriculturally acceptable carrier; wherein all weight percents are based on the total weight of the powder fertilizer composition.

10. The powder fertilizer composition of claim 9 wherein
   i) the water-soluble nitrogen-containing fertilizer is from about 92.0 to about 97.0 weight percent;
   ii) the drift reduction agent is from about 3.0 to about 7.0 weight percent; and
   iii) the silicone defoaming agent is from about 0.1 to about 1.0 weight percent.

11. The powder fertilizer composition of claim 9 wherein the fertilizer comprises diammonium sulfate.

12. The powder fertilizer composition of claim 9 wherein the non-cationic derivatized guar gum comprises hydroxy propyl guar gum.

13. The powder fertilizer of claim 9 additionally comprising from about 0.01 to about 2.5 weight percent of a dedusting agent.

14. A free-flowing, powder fertilizer composition comprising
   i) from about 87.50 to about 99.80 weight percent diammonium sulfate;
   ii) from about 0.01 to about 10.00 weight percent hydroxy propyl guar gum;
   iii) from about 0.01 to about 2.5 weight percent starch encapsulated dimethyl polysiloxane; and
   iv) from about 0.01 to about 2.5 weight percent of a nonyl phenol ethoxylate, wherein all weight percents are based on the total weight of the powder fertilizer composition.

15. A process for preparing a free-flowing, powder fertilizer composition comprising the steps of:
   a) intimately mixing
      i) from about 87.50 to about 99.80 weight percent of a water-soluble, nitrogen-containing fertilizer; and
      ii) from about 0.01 to about 12.49 weight percent of a drift reduction agent selected from the group consisting of non-derivatized guar gum, non-cationic derivatized guar gum, cationic guar gum, and mixtures thereof to form a drift modified fertilizer composition;
   b) milling or grinding said modified fertilizer composition to obtain a uniform particle size composition; and
   c) intimately blending said uniform particle size composition with from about 0.01 to about 12.49 weight percent of a silicone defoaming agent either encapsulated or absorbed in a agriculturally acceptable carrier; wherein all weight percents are based on the total weight percent of the powder fertilizer composition.

16. The process of claim 15 wherein the fertilizer comprises diammonium sulfate.

17. The process of claim 15 wherein the non-cationic derivatized guar gum comprises hydroxy propyl guar or carboxy methyl hydroxy propyl guar gum.

18. The process of claim 15 wherein the non-cationic derivatized guar gum comprises hydroxy propyl guar gum.

19. The process of claim 15 wherein the defoaming agent comprises starch encapsulated dimethyl polysiloxane.

20. The process of claim 15 comprising the additional step of spraying upon the powder fertilizer composition from about 0.005 to about 15.0 weight percent of a dedusting agent.

21. The process of claim 20 wherein the dedusting agent comprises nonionic surfactant.

22. The process of claim 21 wherein the dedusting agent is a nonyl phenol ethoxylate.

23. A process for preparing a free-flowing, powder fertilizer composition comprising the steps of:
   a) intimately mixing
      i) from about 87.50 to about 99.80 weight percent of a water-soluble, nitrogen-containing fertilizer; and
      ii) from about 0.01 to about 10.00 weight percent of a drift reduction agent selected from the group consisting of non-derivatized guar gum, non-cationic derivatized guar gum, cationic guar gum, and mixtures thereof to form a drift modified fertilizer composition;
   b) milling or grinding said modified fertilizer composition to obtain a uniform particle size composition; and
   c) intimately blending said uniform particle size composition with from about 0.01 to about 2.50 weight percent of a silicone defoaming agent either encapsulated or absorbed in an agriculturally acceptable carrier; wherein all weight percents are based on the total weight percent of the powder fertilizer composition.

24. The process of claim 23 wherein
   i) the water-soluble nitrogen-containing fertilizer is present from about 92.0 to about 97.0 weight percent;
   ii) the drift reduction agent is present from about 3.0 to about 7.0 weight percent; and
   iii) the silicone defoaming agent is present from about 0.1 to about 1.0 weight percent.

25. The process of claim 23 wherein the fertilizer comprises diammonium sulfate.

26. The process of claim 23 wherein the non-cationic derivatized guar gum comprises hydroxy propyl guar gum.

27. The process of claim 23 comprising the additional step of spraying upon the powder fertilizer composition from about 0.01 to about 2.50 weight percent of a dedusting agent.

28. A process for preparing a dust-reduced, free-flowing, powder fertilizer composition comprising the steps of:
   a) intimately mixing
      i) from about 87.50 to about 99.80 weight percent of diammonium sulfate; and
      ii) from about 0.01 to about 10.00 weight percent hydroxy propyl guar gum to form a drift modified fertilizer composition;
   b) milling or grinding said modified fertilizer composition to obtain a uniform particle size composition;
   c) intimately blending said uniform particle size composition with from about 0.01 to about 2.50 weight percent of starch encapsulated dimethyl polysiloxane to form a powder fertilizer composition; and
   d) spraying upon said powder fertilizer composition from about 0.01 to about 2.50 weight percent of a nonyl phenol ethoxylate, wherein all weight percents are based on the total weight of the dust reduced, free-flowing powder fertilizer composition so formed.

* * * * *